3,314,933
PYRIDYLAZO COMPOUNDS
Edward F. Elslager and Leslie M. Werbel, Ann Arbor, Mich., assignors to Parke, Davis & Company, Detroit, Mich., a corporation of Michigan
No Drawing. Filed Aug. 30, 1963, Ser. No. 305,866
3 Claims. (Cl. 260—156)

The present invention relates to a novel class of pyridylazo compounds, to acid-addition salts thereof and to methods for their production. More particularly, it relates to 1-{3-{[5,6,7,8-tetrahydro-4-(3-pyridylazo) - 1 - naphthyl]amino}propyl}piperidine compounds and non-toxic acid-addition salts thereof that possess antibacterial activity.

The novel 1-{3-{[5,6,7,8-tetrahydro-4-(3-pyridylazo)-1 - naphthyl]amino}propyl}piperidine compounds with which the present invention is concerned have in their free base form the following structure

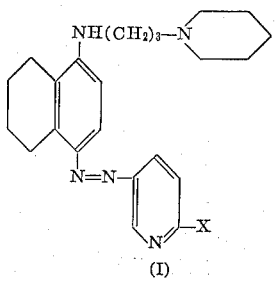

(I)

where X represents a hydrogen atom or a methoxy group.

The compounds of the invention can be prepared by the reaction of 1-{3-[(5,6,7,8-tetrahydro - 1 - naphthyl)amino]propyl}piperidine having in free base form the formula

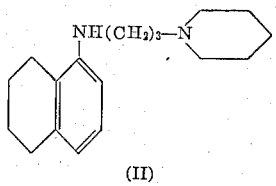

(II)

with a diazonium compound of the formula

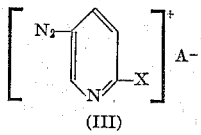

(III)

where A⁻ represents the anion of an acid or the OH⁻ ion and X has the same meaning as given above. Preferably, the reaction is conducted under acidic or neutral conditions (pH≦7), although, if desired, basic conditions can be employed. In carrying out this condensation it is generally satisfactory to employ substantially equivalent quantities of the reactants although a slight excess of either reactant is not harmful. Suitable solvents for the reaction are aqueous mixtures of water-miscible aliphatic alcohols, such as methanol, ethanol and propanol; tetrahydrofuran, N,N-dimethylacetamide, N,N-dimethylformamide, simple organic acids such as formic acid, acetic acid, propionic acid and the like. The acid furnishing the anion represented by A⁻ may also be used as solvent. Where it is desired to carry out the reaction at a controlled pH, a suitable buffer system may be employed. In general, the time and the temperature of the reaction are not critical; it is desirable, however, to avoid heating, and a temperature below 15° C. is generally preferred.

The diazonium compounds of the above formula can be conveniently prepared in situ, by the reaction of an amine of the formula

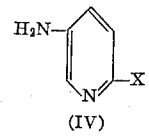

(IV)

with an alkali nitrite, such as sodium nitrite, in an acid medium (pH<7) or by other well-known methods; where X has the aforementioned significance. They can then be added directly to the reaction mixture containing the tetrahydronaphthylamine precursor of Formula II.

The tetrahydronaphthylamine of Formula II employed as a starting material in this reaction can be prepared by reaction of 5,6,7,8-tetrahydro-1-naphthylamine or an alkali metal salt thereof with an aminoalkylating agent of the formula

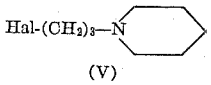

(V)

where Hal represents a halogen atom. The reaction proceeds readily in a solvent medium. Suitable solvents for the reaction are benzene, toluene, xylene and the like. The preferred procedure involves the formation of the sodium salt of the tetrahydronaphthylamine prior to the addition of the aminoalkyl halide. Alternatively, the reaction can be conducted in the presence of a base such as an alkali-metal carbonate, for example, potassium carbonate. The reaction is usually carried out at the boiling point of the solvent used.

The tetrahydronaphthylamine of Formula II can also be prepared by reaction of a N-(3-halopropyl)-5,6,7,8-tetrahydro-1-naphthylamine of formula

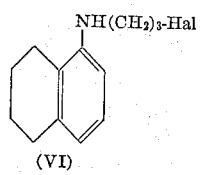

(VI)

with piperidine; where Hal represents a halogen atom. This reaction is preferably carried out in a solvent medium such as ethanol, isopropanol, pentanol, glycols, acetone, dimethylformamide, dimethylacetamide or an excess of the piperidine compound employed in the reaction. The relative proportions of the reactants are not critical; best results are obtained, however, when an excess of the amine is employed. The reaction is favored by temperatures in excess of 50° C. and preferably is carried out between 50 and 150° C.

Another process for the preparation of the compounds of the invention comprises reacting an azo compound of the formula

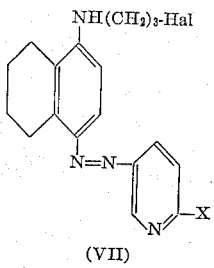

(VII)

with piperidine; wherein Hal represents a halogen atom and X has the aforementioned significance. The reaction is preferably carried out in a solvent medium. Some suitable solvents for this purpose are aliphatic alcohols, such as ethanol, isopropanol, pentanol, or glycols; dimethylformamide, dimethylacetamide, acetone or an excess of piperidine. The relative proportions of the reactants are not critical, although best results are usually obtained when excess piperidine is employed. The reaction is favored by temperatures in excess of 50° C. and is preferably carried out between 50° C. and 150° C.

The azo compounds of Formula VII employed as starting materials in this reaction are conveniently prepared by the reaction of a compound of the Formula VI with a diazonium compound of Formula III wherein X has the aforementioned significance and A⁻ represents the OH⁻ ion or the anion of a hydrohalic acid. Preferably, the reaction is conducted under acidic or neutral conditions (pH≦7) in a suitable solvent, such as a lower aliphatic alcohol, a cyclic ether, or a carboxylic acid. In carrying out this condensation it is satisfactory to employ substantially equivalent quantities of the reactants. The reaction can be carried out at a controlled pH if a suitable buffer system is employed. In general, the time and temperature of the reaction are not critical; it is desirable, however, to avoid heating, and a temperature below 15° C. is preferred.

The compounds of the invention can be employed in the free base form or in the form of their non-toxic acid-addition salts formed by the reaction of the free base with a variety of inorganic and organic acids. Some examples of the many organic and inorganic acids which can be used to produce the non-toxic acid-addition salts are hydrochloric, hydrobromic, hydroiodic, sulfuric, phosphoric, cholic, sulfamic, naphthalene-1,5-disulfonic, phenoxyacetic, lactic, tartaric, gluconic, alginic, citric, succinic, maleic, malonic, adipic, mandelic, oleic, tannic, ethylsulfuric, penicillinic, benzoic, 5,5'-naphthalenedisalicylic, 3- and 5 - phenylsalicylic, 3-hydroxy-2-naphthoic, 4,4'-methylenebis-(3-hydroxy-2-naphthoic), 1,4,5,8 - naphthalenetetracarboxylic, 4 - biphenylcarboxylic, terephthalic, pyromellitic, 8-hydroxy-7-iodo-5-quinolinesulfonic, cyclopentylpropionic, cyclohexanecarboxylic, arsanilic, and arsonic acid.

The compounds of the invention possess valuable antibacterial properties. More particularly, the compounds are effective against *Mycobacterium tuberculosis* infections in mammals. The resistance developed by some strains of tubercle bacilli against such drugs as streptomycin, sodium p-aminosalicylate and isoniazid represents a serious potential obstacle to the treatment of infections caused by these bacilli. One of the objects of the present invention is to provide compounds that are effective against both normal strains of tubercle bacilli and against strains that have developed a resistance to or lessened sensitivity to such prior art drugs. The compounds of the invention are also useful as intermediates for the preparation of other chemical compounds that possess valuable antiparasitic and chemotherapeutic properties. For example, the compounds can be reduced to provide 1-{3-[(4-amino-5,6,7,8-tetrahydro - 1 - naphthyl)amino] propyl}piperidine.

The invention is illustrated by the following examples:

EXAMPLE 1

To a solution of 4.7 g. of 3-aminopyridine in a mixture of 200 ml. of water and 20 ml. of concentrated hydrochloric acid is added at 0° C. with stirring 50 ml. of 1 N sodium nitrite solution. When the diazotization is complete, the solution of 3-pyridine diazonium chloride is added at 0° C. with stirring to a solution of 13.6 g. of 1-{3-[(5,6,7,8 - tetrahydro - 1 - naphthyl)amino]propyl} piperidine in a mixture of 25 ml. of concentrated hydrochloric acid, 100 ml. of water and 700 ml. of ethanol. Stirring is continued for 3.5 hours at 0° C. and the ethanol is removed by heating on the steam bath. Upon cooling, the mixture is made alkaline with sodium hydroxide solution and the precipitated 1-{3-{[5,6,7,8-tetrahydro-4-(3-pyridylazo)-1-naphthyl]amino}propyl}piperidine is collected by filtration, washed with water and dried; M.P. 117–119° C. after crystallization from a 2-propanol-water mixture.

The starting material, 1-{3-[(5,6,7,8-tetrahydro-1-naphthyl)amino]propyl}piperidine, can be prepared as follows: N-γ-chloropropylpiperidine hydrochloride is converted to the free base as follows: 840 g. of the hydrochloride is dissolved in 800 ml. of water, and the solution is treated with 330 ml. of cold concentrated ammonium hydroxide. The mixture is extracted with a total of 2000 ml. of xylene. The xylene solution is washed with water until the washings are nearly neutral, then with saturated aqueous sodium chloride, and dried over anhydrous calcium sulfate. While drying the solution is kept immersed in an ice bath until ready for use in the next step.

A mixture of 503 g. of 5,6,7,8-tetrahydro-1-naphthylamine, 168 g. of a 50% oil dispersion of sodium hydride, and 1500 ml. xylene is heated over a period of 30 minutes to the temperature at which a vigorous reaction, accompanied by the rapid evolution of hydrogen, occurs. After the reaction has subsided, the mixture is held at reflux temperature for 30 minutes, cooled to 50° C. and the xylene solution of N-γ-chloropropylpiperidine is added over 30 minutes with stirring. The mixture is then heated under reflux overnight. The reaction mixture is cooled to 50° and 1500 ml. of water is added with caution. The layers are separated, and the organic layer is washed well with water, dried over anhydrous magnesium sulfate, and concentrated under reduced pressure until most of the xylene has been removed. The residual oil is distilled under reduced pressure providing the desired intermediate as a pale yellow liquid, B.P. 159–160° C./0.1 mm., which solidifies on standing.

EXAMPLE 2

A cold solution of 3.45 g. of sodium nitrite in 40 ml. of water is added at 0° C. with stirring to a solution of 6.2 g. of 6-methoxy-3-aminopyridine in a mixture of 100 ml. of water and 15 ml. of concentrated hydrochloric acid. After 15 minutes, the diazonium salt solution is added with stirring to a solution of 13.6 g. of 1-{3,-[(5,6,7,8-tetrahydro-1-naphthyl)amino]-propyl}piperidine in a mixture of 200 ml. of water and excess concentrated hydrochloric acid while the temperature is maintained at 0–5° C. The resulting dark red solution is stirred at 2° C. for 2.5 hours and made alkaline with dilute ammonium hydroxide solution. The precipitated 1-{3-{[5,6,7,8-tetrahydro - 4 - (6-methoxy-3-pyridylazo)-1-naphthyl]amino} propyl}piperidine is collected by filtration washed with water, and dried; M.P. 129–131° C. after crystallization from 2-propanol.

Alternatively, the desired 1-{3-{[5,6,7,8-tetrahydro-4-(6 - methoxy - 3 - pyridylazo) - 1 - naphthyl]amino}propyl}piperidine can be prepared from N-(3-bromopropyl)-5,6,7,8 - tetrahydro - 4 - (6 methoxy - 3 - pyridylazo)-1-naphthylamine as follows: a mixture of 8.1 g. of N-(3-bromopropyl) - 5,6,7,8 - tetrahydro - 4 - (6 - methoxy - 3-pyridylazo)-1-naphthylamine and 50 ml. of piperidine is heated on the steam bath for 2 hours, cooled and poured into 500 g. of ice with stirring. The crude product is collected by filtration, dried, and crystallized from 2-propanol; M.P. 128–130° C.

N - (3 - bromopropyl) - 5,6,7,8 - tetrahydro - 4 - (6-methoxy-3-pyridylazo)-1-naphthylamine, employed as a starting material in the above preparation, can be synthesized as follows: 225 g. of 3-[(5,6,7,8-tetrahydro-1-naphthyl)amino]-1-propanol is dissolved in 1160 ml. of 48% hydrobromic acid and the mixture is heated under reflux for 5 hours. Upon cooling, the solid that separates is collected by filtration, washed with 2-propanol and dried. The intermediate N-(3-bromopropyl)-5,6,7, 8-tetrahydro-1-naphthylamine hydrobromide thus obtained melts at 195–197° C. This intermediate (105 g.) is dissolved in 1400 ml. of hot ethanol and the solution is cooled rapidly with stirring. To it is added at 0–10° C. a cold solution of 6-methoxy-3-pyridine diazonium bromide prepared from 37.2 g. of 6-methoxy-3-aminopyridine, 20.7 g. of sodium nitrite, 1200 ml. of water, and 110 ml. of 48% hydrobromic acid. The purple mixture is stirred for 3 hours at 0–5° C., then refrigerated for 8 hours. The mixture is made alkaline with aqueous sodium hydroxide and the intermediate N-(3-bromopropyl)-5,6,7,8-tetrahydro - 4 - (6 - methoxy - 3 - pyridylazo) - 1 - naphthylamine is collected and dried.

The acid-addition salt of 1-{3-{[5,6,7,8-tetrahydro-4-(6 - methoxy - 3 - pyridylazo) - 1 - naphthyl] - amino}propyl}piperidine with one formula weight of hydrochloric acid is prepared by treating an ether solution of 0.5 g. of the free base with one equivalent of dry hydrogen chloride, isolating the precipitated solid, and crystallizing from dimethylformamide-ethyl acetate; M.P. 214–216° C.

The salt of 1-{3-{[5,6,7,8-tetrahydro-4-(6-methoxy-3-pyridylazo)-1-naphthyl]amino}propyl}piperidine with one formula weight of salicylic acid is prepared according to the following procedure. A solution of 2.0 g. of the free base in ether is thoroughly mixed with an ether solution of 1.36 g. of salicylic acid, and the precipitated salt is isolated and dried; M.P. 163–165° C.

EXAMPLE 3

A solution of 0.99 g. of 1,5-naphthalenedisulfonic acid disodium salt dihydrate in water is added to an aqueous solution of 1-{3-{[5,6,7,8-tetrahydro-4-(6-methoxy-3-pyridylazo) - 1 - naphthyl]amino}propyl}piperidine containing 5.3 ml. of 1 N hydrochloric acid. The precipitated salt of 1-{3-{[5,6,7,8-tetrahydro-4-(6-methoxy-3-pyridylazo)-1-naphthyl]amino}propyl}piperidine with one formula weight of 1,5-naphthalenedisulfonic acid is isolated and recrystallized from dimethylformamide; M.P. 235° C.

EXAMPLE 4

An aqueous solution of 2.03 g. of 1-{3-{[5,6,7,8-tetrahydro - 4 - (6 - methoxy - 3 - pyridylazo) - 1 - naphthyl]amino}propyl}piperidine containing 10.0 ml. of 1 N hydrochloric acid is added to a warm aqueous solution of 2.34 g. of 4,4′-methylenebis(3-hydroxy-2-naphthoic acid) disodium salt dihydrate. The precipitated salt of 1-{3-{[5,6,7,8 - tetrahydro - 4 - (6 - methoxy - 3 - pyridylazo)-1-naphthyl]amino}propyl}piperidine with one-half formula weight of 4,4′-methylenebis(3-hydroxy-2-naphthoic acid) is isolated, washed with water, dried, and crystallized from dimethyl sulfoxide-water; M.P. 135° C.

We claim:

1. A member of the class consisting of 1-{3-{[5,6,7,8-tetrahydro - 4 - (3 - pyridylazo) - 1 - naphthyl]amino}propyl}piperidine compounds of the formula

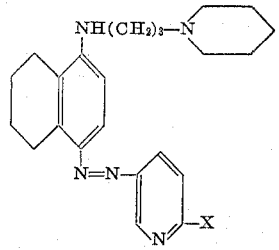

and non-toxic acid-addition salts thereof; where X is a member of the class consisting of hydrogen and methoxy.

2. 1 - {3 - {[5,6,7,8 - tetrahydro - 4 - (3 - pyridylazo)-1-naphthyl]amino}propyl}piperidine.

3. 1 - {3 - {[5,6,7,8 - tetrahydro - 4 - (6 - methoxy - 3-pyridylazo)-1-naphthyl]amino}propyl}piperidine.

References Cited by the Examiner
UNITED STATES PATENTS

| | | | |
|---|---|---|---|
| 2,226,174 | 12/1940 | McNally et al. | 260—152 |
| 2,269,218 | 1/1942 | McNally et al. | 260—152 X |
| 2,857,391 | 10/1958 | Engelhardt et al. | 260—293 X |
| 2,884,455 | 4/1959 | Robertson et al. | 260—570.8 |
| 2,905,670 | 9/1959 | Kindler et al. | 260—570.8 X |

CHARLES B. PARKER, *Primary Examiner.*

DONALD M. PAPUGA, *Assistant Examiner.*